US011836279B2

(12) United States Patent
Lu et al.

(10) Patent No.: US 11,836,279 B2
(45) Date of Patent: Dec. 5, 2023

(54) STORAGE DEVICES WITH SECURE POWER AND DATA ACCESS

(71) Applicant: HEWLETT-PACKARD DEVELOPMENT COMPANY, L.P., Spring, TX (US)

(72) Inventors: Chung-Pao Lu, Taipei (TW); Chien-Hao Lu, Taipei (TW); Chia Ching Lu, Taipei (TW); Po-Cheng Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 295 days.

(21) Appl. No.: 17/514,537

(22) Filed: Oct. 29, 2021

(65) Prior Publication Data

US 2023/0134988 A1 May 4, 2023

(51) Int. Cl.
| | |
|---|---|
| *G06F 21/78* | (2013.01) |
| *G06F 21/85* | (2013.01) |
| *H04W 12/08* | (2021.01) |
| *G06F 21/32* | (2013.01) |
| *H04L 9/40* | (2022.01) |

(52) U.S. Cl.
CPC .............. *G06F 21/78* (2013.01); *G06F 21/85* (2013.01); *H04W 12/08* (2013.01)

(58) Field of Classification Search
CPC .......... G06F 21/78; G06F 21/85; G06F 21/32; G06F 21/35; H04W 12/08; H04W 12/50; H04W 12/06; H04L 63/083; H04L 63/0861; H04L 63/18
See application file for complete search history.

(56) References Cited

U.S. PATENT DOCUMENTS

| | | | | |
|---|---|---|---|---|
| 2014/0108799 | A1* | 4/2014 | Wang | H04W 12/08 713/168 |
| 2016/0320867 | A1* | 11/2016 | Chan | H02J 50/10 |
| 2019/0296799 | A1* | 9/2019 | Park | H02J 50/80 |
| 2020/0334372 | A1* | 10/2020 | Kim | H04L 63/102 |
| 2021/0081518 | A1* | 3/2021 | Park | G06V 40/50 |
| 2023/0119196 | A1* | 4/2023 | Kotake | G06F 3/0637 726/18 |

* cited by examiner

*Primary Examiner* — Amie C. Lin
(74) *Attorney, Agent, or Firm* — QUARLES & BRADY LLP

(57) ABSTRACT

An example device includes a physical storage medium, a wireless power circuit, and a portable sealed housing containing the physical storage medium and the wireless power circuit. The physical storage medium stores a first security protocol to activate the wireless power circuit, and a second security protocol to allow data transfer between the physical storage medium and a host device.

15 Claims, 5 Drawing Sheets

STORAGE DEVICES WITH SECURE POWER AND DATA ACCESS

BACKGROUND

Storage devices are useful to store data, such as documents, data files, images, music, and video. Storage devices are often local to a computing device, such as a solid-state drive (SSD) installed in a personal computer. Storage devices may also be provided to a network, so that a user may access data from various computing devices connected to the network.

DETAILED DESCRIPTION

Locally installed storage devices provide physical security because access to the computing device is usually required to access the data at the storage device. In addition, the computing device may be protected by a password or other security mechanism. However, locally installed storage devices are typically not readily portable. A computing device may need to be disassembled to remove the storage device. Once the storage device is removed, the computing device can no longer provide security.

Networked storage devices provide portability of data, in the sense that data may be accessed from various computing devices at different locations. However, access may be subject to network outages and security may be susceptible to network-based attacks.

Portable storage devices may be used for data portability, but these devices are often subject to physical damage and wear-and-tear, due to being carried around, and often lack strong security mechanisms. Some such portable storage devices include a simple security mechanism, relying on physical possession of the device for any additional security.

The present disclosure provides an enclosed standalone portable storage device that uses wireless power and wireless data communications. The portable storage device may be used to store user data and/or may be bootable by a host computer. A two-stage security protocol is used to, first, provide power for operation and/or charging and, second, allow data transfer. Both stages are passed to access data, yet only the first stage need be passed to power or charge the device. A user's computing device, such as their smartphone, may be used with the two-stage security protocol. The portable storage device may be provided without physical ports and may be sealed to reduce the intrusion of dust, debris, and moisture. Accordingly, the portable storage device may provide for robust data portability with a high degree of security.

Figure 1:
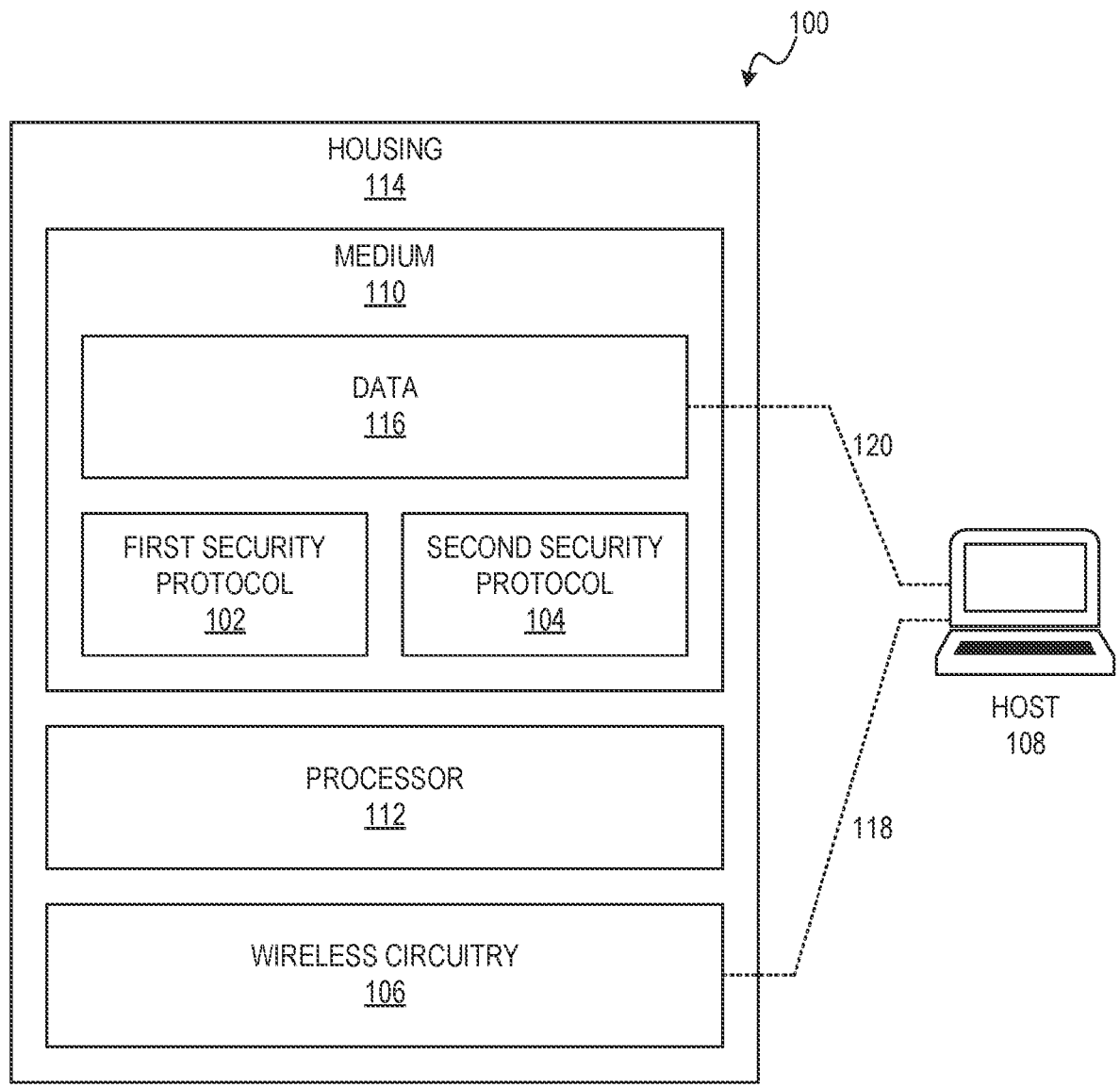
FIG. 1 is a block diagram of an example portable storage device that includes security protocols to activate wireless circuitry to power the device and allow data transfer with a host.

FIG. 1 shows an example portable storage device 100 that includes security protocols 102, 104 to respectively activate wireless circuitry 106 to allow powering of the device 100 and/or allow data transfer with a host computing device 108. The device 100 may be a portable storage device that wirelessly connects to the host 108 to share data, such as documents, data files, images, music, video, and so on. The device 100 may allow a user to readily transport data among various hosts, which may include a desktop computer, notebook computer, all-in-one (AiO) computer, server, or similar computing device. In addition, the device 100 may be configured to boot the host 108.

The portable storage device 100 includes a physical storage medium 110, wireless circuitry 106, a processor 112, and a portable sealed housing 114 that contains the physical storage medium 110, wireless circuitry 106, and processor 112.

The physical storage medium 110 may include a non-transitory machine-readable medium, such as flash memory, a solid-state drive (SSD), a hard disk drive (HOD), or similar non-volatile storage device.

The wireless circuitry 106 may include components to enable wireless communication, such as an inductive circuit to receive power from an outside source, such as a complementary circuit at the host 108, and/or a wireless chipset and antenna to communicate data with the host 108.

The processor 112 may include a central processing unit (CPU), a microcontroller, a microprocessor, a field-programmable gate array (FPGA), an application-specific integrated circuit (ASIC), or a similar device capable of executing instructions. The processor 112 may cooperate with a non-transitory machine-readable medium, such as the physical storage medium 110, that stores instructions. The processor 112 may also cooperate with volatile memory, such as random-access memory (RAM), to execute instructions and store working or temporary data related to the techniques discussed herein.

In various examples where the physical storage medium 110 is bootable by the host 108, the processor 112 may be omitted and the host 108 may execute the instructions with its processor.

Instructions may include directly executed instructions, such as a binary sequence or machine code. Instructions may include interpretable code, bytecode, source code, or similar instructions that may undergo additional processing to be executed. All of such examples may be considered processor-executable instructions.

The physical storage medium 110 may also store data 116 that is to be stored, transported, and/or shared among hosts 108.

The housing 114 may be shaped and sized to be readily portable and may be sealed against the intrusion of dust, debris, and moisture. The housing 114 may be water-resistant or waterproof. The housing 114 may be factory-sealed (e.g., snap fit, ultrasonic welded, glued, etc.) or may be secured shut with fasteners (e.g., with screws, tamper-resistant screws, etc.) to prevent opening.

The portable storage device 100 may include a battery (not shown) to store electrical power received via the wireless circuitry 106.

The portable storage device 100 is capable of receiving power from the host 108 via the wireless circuitry 106, shown as power link 118. Received power may be used to operate the device 100 and charge the battery, if present. The device 100 is also capable of communicating data 116 with the host 108 via a data link 120. Data link 120 is shown schematically and may have the same pathway as power link 118 or may have a different pathway, such as via a separate wireless communications circuit (not shown) of the device 100.

The portable storage device 100 includes two security processes or protocols 102, 104 that may be executed by the processor 112 or by a processor of the host 108. A first security protocol 102 allows for the device 100 to consume power and activates the wireless circuitry 106. A second security protocol 104 allows transfer of data 116 between the physical storage medium 110 and a host device 108. The second security protocol 104 may be different from the first security protocol 102. The security protocols 102, 104 may use different types of credentials. Hence, powering of the device 100 may be protected by one security protocol 102, so that powering the device 100 is relatively easy and convenient for the user, while data access may be protected by both security protocols 102, 104, so that a relatively higher degree of data security is maintained.

The first security protocol 102 may use a first credential, such as a password or personal identification number (PIN), that is shareable. As such, the user may easily ask someone else to assist in the powering or charging of the device 100. The second security protocol 104 may use a second credential, such as a biometric or secondary device (e.g., the user's smartphone), that is less readily sharable or not sharable. As such, the user's data 116 may have a greater degree of security even if another person is given the first credential for powering or charging the device 100.

The first security protocol 102 may include establishing a first credential, such as a password, for the user based on a physical identifier, such as a code on an outside of the housing 114 of the device 100, The first security protocol 102 may subsequently include checking the user's password. The host 108 to which the device 100 is connected may provide a user interface, such as a keyboard and display, to enter a password. The host 108 may communicate with the device 100 to compare an entered password with a previously set password.

The second security protocol 104 may include establishing a second credential, such as a user's biometric, such as a fingerprint, voiceprint, or similar. The device 100 or host 108 may include a scanner, such as a fingerprint scanner, to capture a user's biometric, so that the biometric may be established and then later checked.

Execution of the second security protocol 104 may be conditional on successful authorization via the first security protocol 102. This may be considered a two-stage security protocol that, first, initiates wireless power flow from the host 108 to the device 100 or otherwise powers the device 100 and, second, permits communication of data between the device 100 and the host 108.

The first and second security protocols 102, 104 may be initially set up when connected to a host 108.

The data link 120 may allow limited data communication between the device 100 and the host 108, such as data communications to set up the first and second security protocols 102, 104 and to allow the entry and confirmation of data relevant to the security protocols 102, 104. For example, an established password or biometric may be stored at the device 100 and the host 108 may be used to enter a candidate password or biometric that is to be checked against the established password or biometric stored at the device 100. The data link 120 providing such limited communications allows for the device 100 to omit a user input device, such as buttons, keys, or a touchscreen. Omitting a user input device further reduces the risk of intrusion of dust and water, in that the housing 114 may be more completely sealed, and further increases the robustness of the device 100, in that there is one less hardware component to potentially fail.

Communications of the data link 120 may be controlled to allow access to the security protocols 102, 104 and related data (e.g., an established password or biometric) independent to allowing access to data 116 protected by the second security protocol 102. This may be achieved by the enforcing permissions to different regions of the medium 110. For example, various sectors of the medium 110 may be assigned different read and/or write permissions.

In various examples, the security protocols 102, 104 allow low-level powering of the device 100 prior to passing the first security protocol 102, so that power is available to execute the first security protocol 102.

In an example of operation, the portable storage device 100 is initially set up by establishing first and second credentials for the first and second security protocols 102, 104. The device 100 may communicate via the data path 120 to establish and store the credentials at the device 100. During later use, the device 100 may be in need of power or charging. The device 100 may then be brought into the effective range of wireless circuitry of a host 108. The first security protocol 102 may present a challenge which must be met by providing a credential that matches the stored first credential to allow the wireless circuitry 106 to power the device 100, so that the device 100 may be provided with sufficient power for data transfer or so that its battery may be charged. At the same time or at a later time, a user may wish to access data 116 stored at the device 100. Having already satisfied the first security protocol 102, the user may provide a second credential that matches the stored second credential to allow access to the data 116. Hence, a two-stage or two-factor authentication may be used to secure the data 116, whereas a single stage or factor is sufficient to provide electrical power to the device 100.

Figure 2:
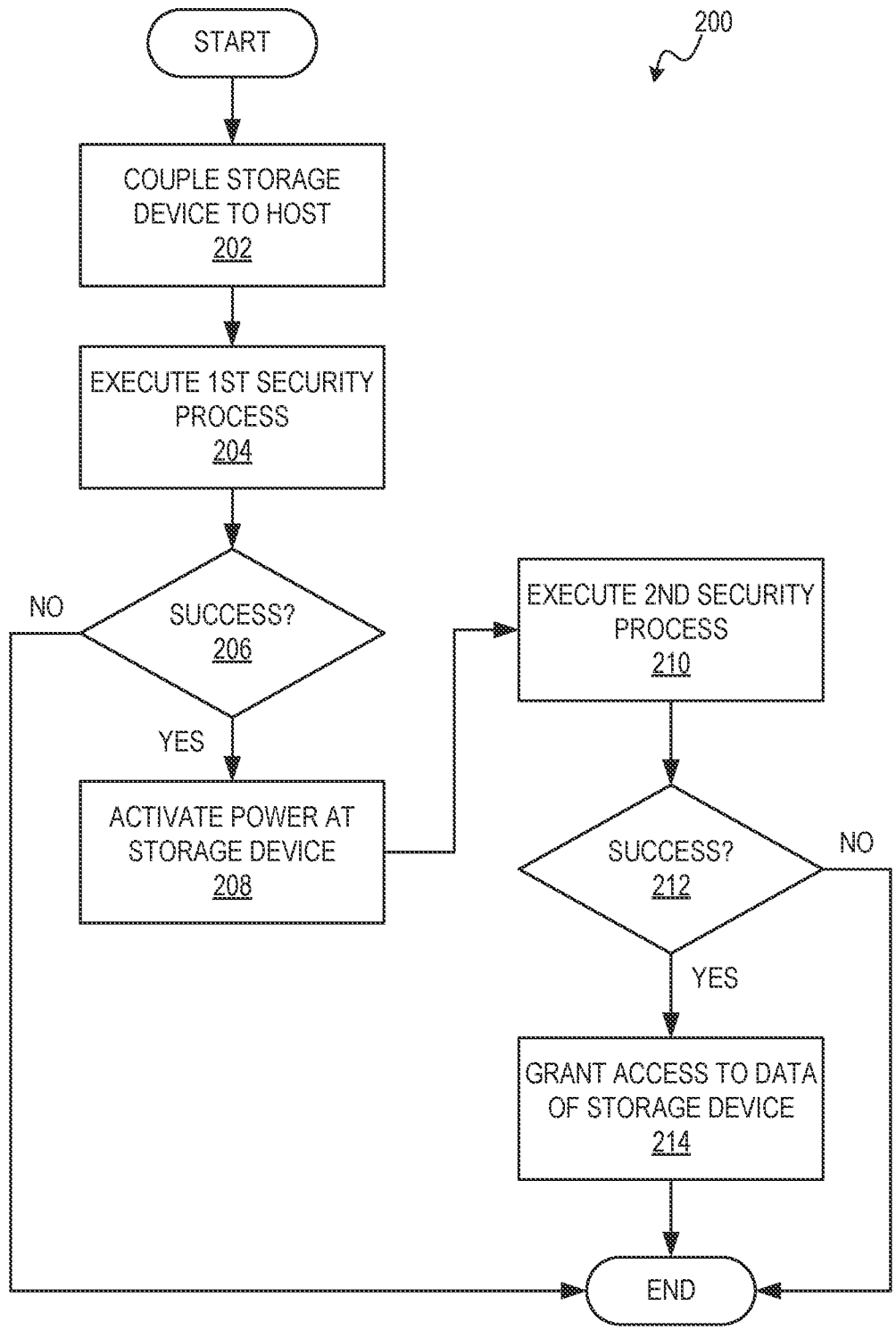
FIG. 2 is a flowchart of an example method of activating wireless circuitry of a portable storage device to allow power and data transfer with a host.

FIG. 2 shows an example method 200 of activating wireless circuitry of a portable storage device to allow power and data transfer with a host. The method 200 may be implemented with any of the devices discussed herein as, for example, processor-executable instructions.

At block 202, the portable storage device is coupled to a host computing device. Such coupling may include bringing the storage device into vicinity of an electromagnetic circuitry of the host to allow interaction with a complementary circuit at the storage device. Such interaction may include power transmission via induction, data transmission via induction, or data transmission by a wireless communications protocol (e.g., Bluetooth™ or Wi-Fi™). Block 202 may include the host detecting the presence of the portable storage device by an inductive power circuit at the host detecting the presence of a complementary circuit at the portable storage device.

At block 204, in response to detecting the coupling of the portable storage device to the host, a first security process or protocol is executed. This may include a user interface of the host prompting the user for a previously established credential, such as a password, biometric, or similar credential.

At block 206, if authentication via the first security process is unsuccessful, then the method 200 ends and may be restarted. Additionally, the first security process may timeout if the portable storage device and the host are decoupled. For example, if the portable storage device is moved out of the effective range of the host, then the method 200 may end.

At block 208, if authentication via the first security process is successful, then a wireless power circuit of the portable storage device is activated to power the device and accept power transmission from a host device.

At block 210, after and conditional upon successful authorization of the user through the first security process, a second and different security process or protocol is executed. This may include a user interface of the host prompting the user for a previously established credential, such as a password, biometric, or similar credential.

At block 212, if authentication via the second security process is unsuccessful, then the method 200 ends and may be restarted. Additionally, the second security process may timeout if the portable storage device and the host are decoupled. For example, if the portable storage device is moved out of the effective range of the host, then the method 200 may end.

At block 214, if authentication via the second security process is successful, then a wireless communications circuit of the portable storage device may be activated to allow communication of data between the portable storage device and the host.

Accordingly, data may be communicated between the portable storage device and the host via respective wireless circuitry contingent on successful passing of both stages (blocks 204, 206, 210, 212) of the two-stage security protocol defined by the first and second security processes. That said, the device may be fully powered up and wireless power from the host may accepted by the portable storage device contingent on successful passing of the first stage (blocks 204, 206) of the two-stage security protocol.

Figure 3:
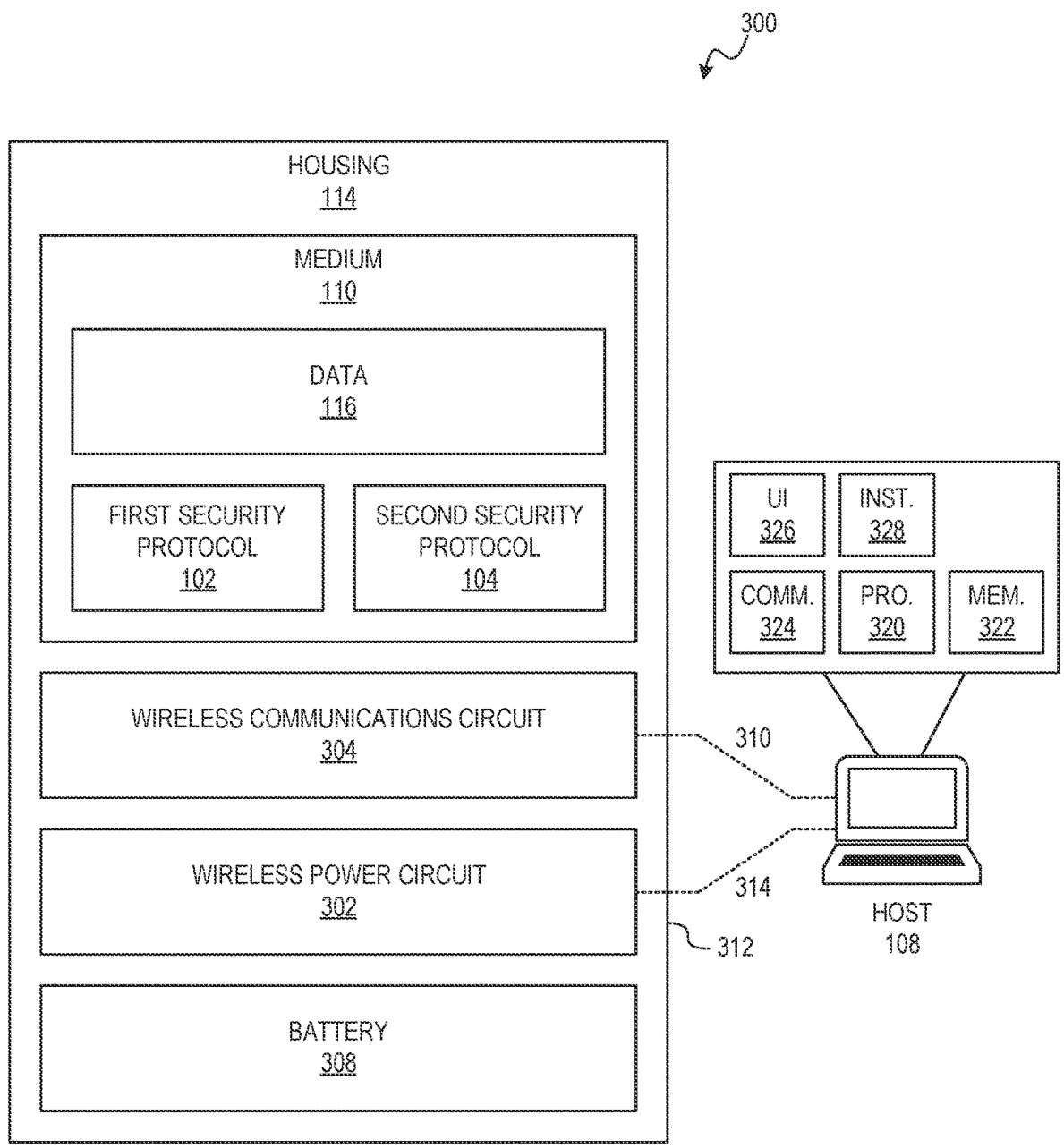
FIG. 3 is a block diagram of an example portable storage device that includes security protocols to respectively activate a wireless power circuit to power the device and allow power transfer from a host and activate a wireless communications circuit to allow data transfer with the host.

FIG. 3 shows an example portable storage device 300 that includes security protocols 102, 104 to respectively activate a wireless power circuit 302 to allow power transfer from a host 108 and active a wireless communications circuit 304 to allow data transfer with the host 108. Reference to the description of the components of the other devices discussed herein may be made for details not repeated here.

The device 300 includes a physical storage medium 110, a wireless communications circuit 304, a wireless power circuit 302, a battery 308, and a portable sealed housing 114 that contains the aforementioned components.

The wireless communications circuit 304 may be connected to the physical storage medium 110 and may include a chipset and related antenna to communicate data with a like circuit at the host 108 according to a protocol, such as a Bluetooth™ protocol, Bluetooth™ Low Energy (BLE) protocol, or Institute of Electrical and Electronics Engineers (IEEE) 801.11 (e.g., Wi-Fi™) protocol. The wireless communications circuit 304 may provide a data path 310 for communications of wireless data signals with the host 108 through a wall 312 of the housing 114.

The wireless power circuit 302 may be connected to the battery 308 and may include components, such as a coil, a rectifier, and a regulator, configured to receive power from an outside source, such as a complementary circuit at the host 108. The coil may be shaped, sized, and positioned within the housing 114 to receive inductive transmission from a similar coil that is part of the host 108. The rectifier and regulator may convert induction received by the coil into a form of power and/or data usable by the device 300. The wireless power circuit 302 may provide a power path 314 for communications of wireless power signals from the host 108 through the wall 312 of the housing 114.

The wireless power circuit 302 may control power distribution to the components of the device 300 and may control the charging of the battery 308.

The host computing device 108 may include a processor 320, memory 322, and wireless communications circuit 324 to perform the functionality discussed herein. The host computing device 108 may further include a user interface device 326 to allow a user to enter credentials for the first and second security protocols 102, 104 to first establish such credentials and to later compare provided credentials to the established credentials. Examples of user interface devices include a touchscreen, keyboard, fingerprint reader, and similar. The host computing device 108 may include processor-executable instructions 328 stored at a non-transitory machine-readable memory to implement this functionality. Such instructions 328 may be referred to as an application or app.

The host 108 may execute a two-stage security protocol to activate the wireless power circuit 302 of the portable storage device 300 to fully power the device 300 and allow wireless charging of the battery 308, via the power path 314, and to communicate data 116 between the storage medium 110 and the host 108 using the wireless communications circuit 304, via the data path 310. The two-stage security protocol may include a first stage controlled by a first security protocol 102 to govern power and charging of the battery 308. The two-stage security protocol may further include a second stage controlled by a second, different security protocol 104 to govern communication of data 116.

The wireless power circuit 302 may allow the device 300 to operate on a relatively low-level of power from the battery 308 or directly from the host 108 prior to passing the first stage, so that the portable storage device 300 has sufficient power to cooperate with the security protocols 102, 104.

Accordingly, the processor 320 of the host 108 may allow for power via the wireless power circuit 302 to fully power up the device 300 and charge the battery 308 contingent on successful passing of the first stage of the two-stage security protocol. The processor 320 may further allow communication of data 116 between the storage medium 110 and the host 108 contingent on successful passing of both stages of the two-stage security protocol. That is, the processor 320 may prevent communication of data 116 until both protocols 102, 104 have been satisfied.

Figure 4:
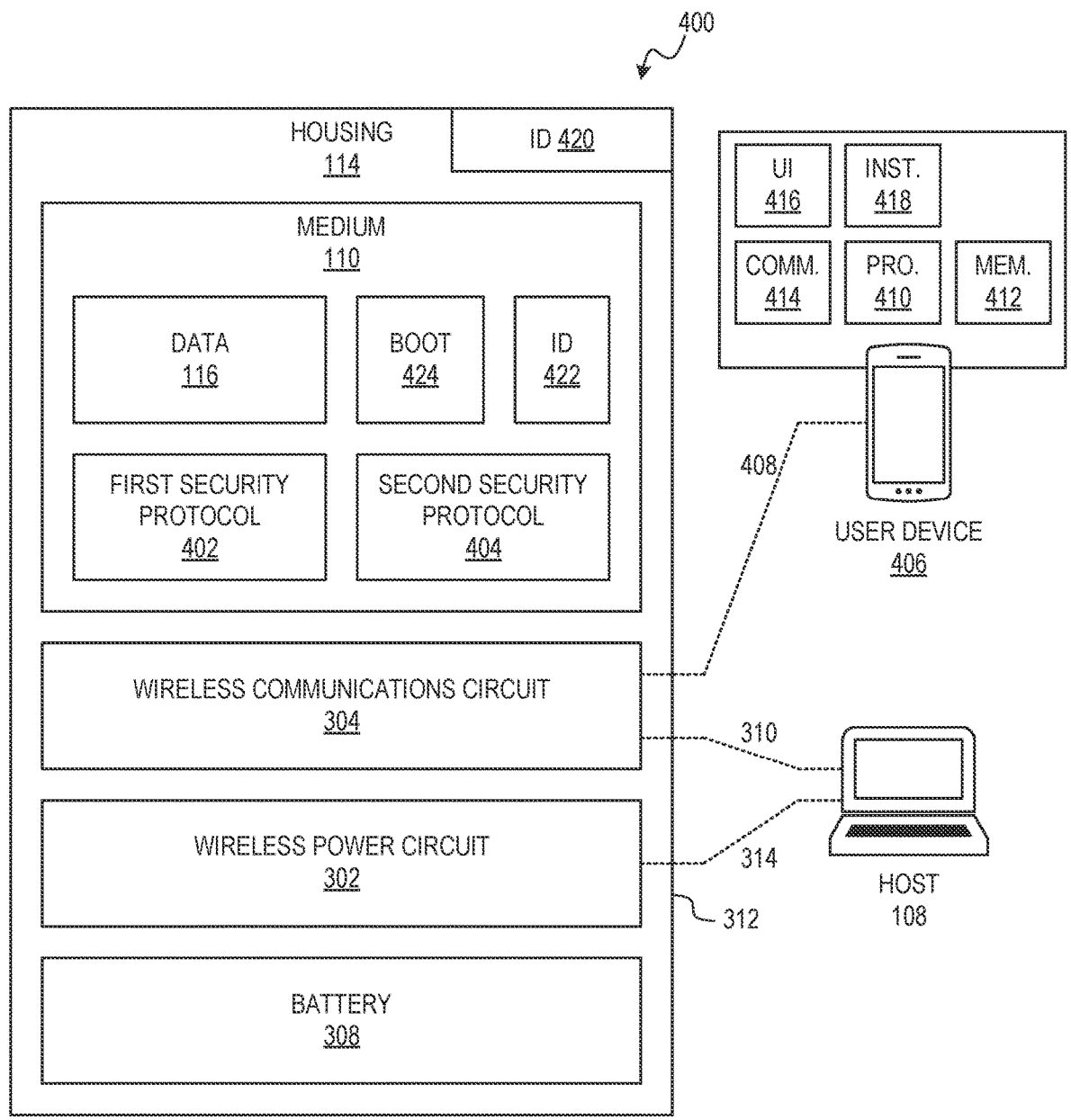
FIG. 4 is a block diagram of an example portable storage device that includes security protocols operable with a user computing device to control power and data transfer with a host.

FIG. 4 shows an example portable storage device 400 that includes security protocols 402, 404 operable with a user computing device 406 to control power and data transfer with a host computing device 108. Reference to the description of the components of the other devices discussed herein may be made for details not repeated here.

The portable storage device 400 includes a physical storage medium 110, a wireless communications circuit 304, a wireless power circuit 302, a battery 308, and a portable sealed housing 114 that contains the aforementioned components.

The portable storage device 400 may further include first and second security protocols 402, 404 to respectively control power of the device 400 and transfer of data 116 between the device 400 and the host 108. The first and second security protocols 402, 404 may be stored in the medium 110.

The wireless communications circuit 304 may communicate with the user computing device 406, which may be a portable computing device, such as a smartphone or tablet computer. The wireless communications circuit 304 may provide a data path 408 with the user computing device 406 independent of the data path 310 with the host 108.

Authentication through the first and second security protocols 402, 404 may be performed with the user computing device 406. That is, a user may operate the user computing device 406 to provide a first credential to satisfy the first security protocol 402 to fully power the device 400 and/or activate the power path 314 to allow wireless charging of the device 400 by the host 108. The user may also operate the user computing device 406 to provide a second credential to satisfy the second security protocol 404 to activate the data path 310 to allow data communication between the device 400 and the host 108.

The user computing device 406 may include a processor 410, memory 412, and wireless communications circuit 414 to perform the functionality discussed herein. The user computing device 406 may further include a user interface device 416 to allow a user to enter credentials for the first and second security protocols 402, 404 to first establish such credentials and to later compare provided credentials to the established credentials. Examples of user interface devices include a touchscreen, keyboard, fingerprint reader, and similar. The user computing device 406 may include processor-executable instructions 418 stored at a non-transitory machine-readable memory to implement this functionality. Such instructions 418 may be referred to as an application or app.

The portable storage device 400 may include a physical identifier 420, such as number, alphanumeric, or scannable code (e.g., a barcode or OR code) on a sticker or marking on the housing 114. The physical identifier 420 may correspond to a digital identifier 422 stored at the medium 110. The processor 410 and user computing device 406 may cooperate to compare the physical identifier 420 to the digital identifier 422 to verify that the user computing device 406 is proximate to the device 400 and thus that the user of the computing device 406 may be assumed to be in possession of the device 400. For example, the user computing device 406 may provide for scanning, typing, or other entry of the physical identifier 420, which may then be compared to the digital identifier 422 by the portable storage device 400 or the user computing device 406. If the identifiers 420, 422 match, then the user of the computing device 406 may be confirmed as possessing the portable storage device 400.

The physical identifier 420 may be considered a credential of the first security protocol 402 and/or second security protocol 404. Successful matching of the physical identifier 420 to the digital identifier 422 may accordingly satisfy the respective security protocol 402, 404. Alternatively, the successful matching of the physical identifier 420 to the digital identifier 422 may be used to prove possession of the portable storage device 400 as a condition for allowing the establishing of credentials for the security protocols 402, 404.

The portable storage device 400 may include a boot sector 424 at the medium 110. The boot sector 424 may include code that is bootable by the host device 108. Accordingly, the portable storage device 400, when coupled to the host 108 by the data path 310, may be a bootable device of the host 108. The first and second security protocols 402, 404 may be executed by the host 108 after boot of the portable storage device 400. The first and second security protocols 402, 404 may communicate with the user computing device 406 to grant further power to the portable storage device 400 and to grant access to data 116 by the host 108.

Figure 5:
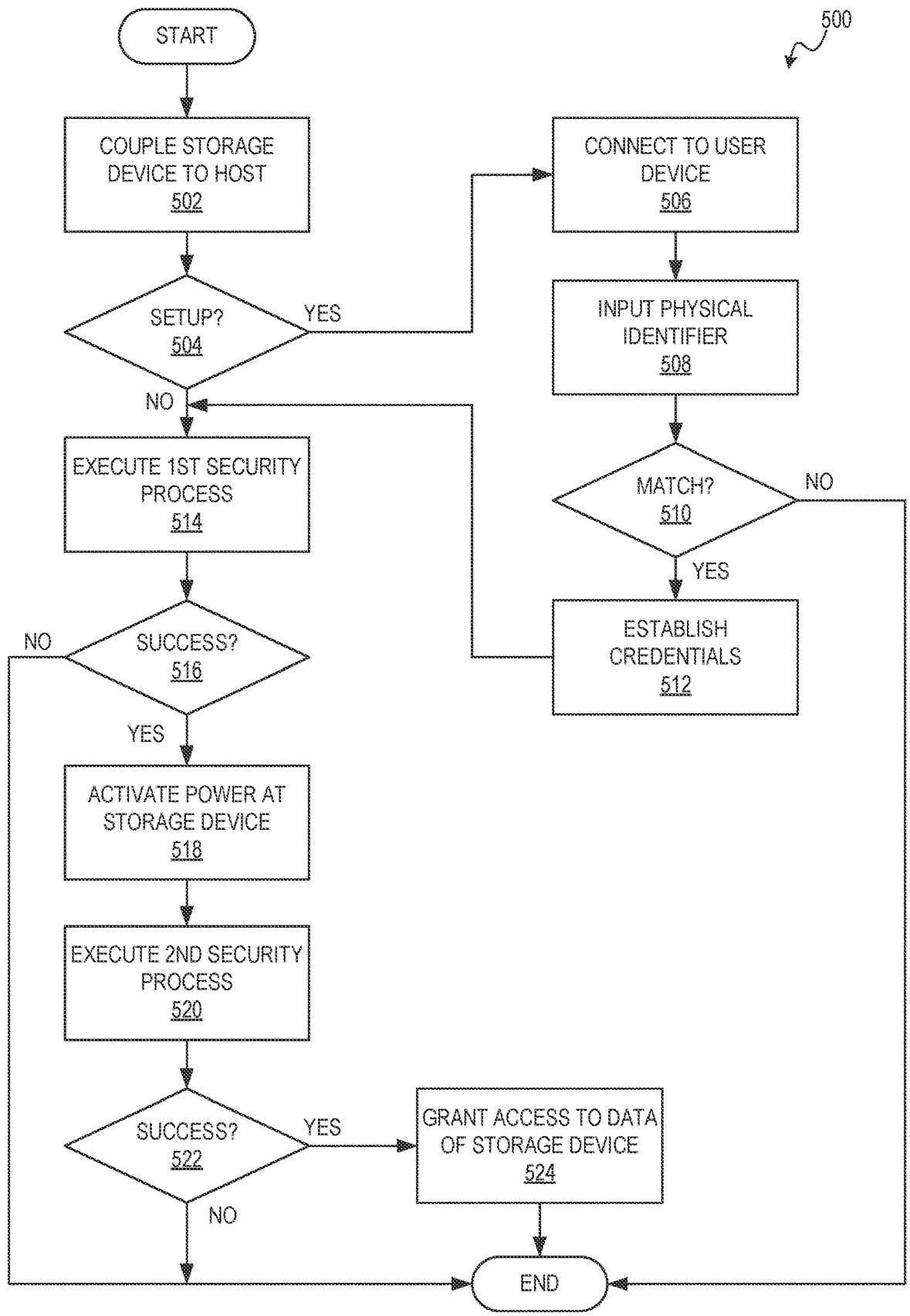
FIG. 5 is a flowchart of an example method of operating security protocols of a portable storage device with a user computing device to control power and data transfer of the portable storage device with a host.

FIG. 5 shows example method 500 of operating security protocols of a portable storage device with a user computing device to control power and data transfer of the portable storage device with a host. The method 500 refers to the system of FIG. 4 for context but is not limited by the system of FIG. 4.

At block 502, the portable storage device is coupled to a host computing device. Such coupling may include bringing the storage device into the effective range of an electromagnetic charging circuitry (power transmitter) of the host to allow the host to detect a complementary electromagnetic charging circuit (power receiver) at the portable storage device. As such, the host may detect the presence of the portable storage device by induction.

At block 504, it is determined whether the security protocols of the portable storage device are to be set up to establish credentials. This may be performed initially when the portable storage device is first used or when the user forgets or loses a credential.

If set up is to be performed, then at block 506, the portable storage device connects to a user computing device, such as the user's smartphone, via a short-range wireless protocol, such as Bluetooth™. The portable storage device may be configured to initiate such a connection upon detecting the coupling to the host, at block 502, Alternatively or additionally, the user computing device may be configured to initiate such a connection by the user selecting such at the user computing device.

At block 508, the user computing device may prompt the user to enter a physical identifier provided to the outside of the portable storage device, such as by way of a machine-scannable or human-readable code.

At block 510, if the entered identifier does not match an identifier stored in the portable storage device, then the method 500 ends and may be restarted.

If the entered identifier matches the identifier stored in the portable storage device, then the user is confirmed to be in possession of the portable storage device. In response, at block 512, the user is prompted to enter credentials for granting power and data access to the portable storage device. Example types of credentials are discussed elsewhere herein. The user may enter such credentials using the user interface of the user computing device. The entered credentials may then be transmitted from the user computing device to the portable storage device, so that the credentials are established at the portable storage device.

After setup or if setup is not performed, at block 514, a first security process or protocol is executed. This may include a user interface of the host prompting the user for a previously established credential (from block 512). Block 514 may be performed after the host has been booted with the portable storage device, so that the portable storage device has control of the user interface of the host. Alternatively, the user computing device (e.g., smartphone) may provide a user interface to the portable storage device. In any case, data transfer is not yet allowed between the host and the portable storage device, aside from limited communication of data required to facilitate execution of the security processes.

At block 516, if authentication via the first security process is unsuccessful, then the method 500 ends and may be restarted. Additionally, the first security process may timeout if the portable storage device and the host are decoupled or if the connection between the portable storage device and user computing device is broken.

At block 518, if authentication via the first security process is successful, then a wireless power circuit of the portable storage device is activated to fully power the portable storage device and accept power transmission from a host device.

At block 520, after and conditional upon successful authorization of the user through the first security process, a second and different security process or protocol is executed. This may be performed similar to block 514.

At block 522, if authentication via the second security process is unsuccessful, then the method 500 ends and may be restarted. Additionally, the second security process may timeout if the portable storage device and the host are decoupled or if the connection between the portable storage device and user computing device is broken.

At block 524, if authentication via the second security process is successful, then a wireless communications circuit of the portable storage device may be controlled to allow communication of data between the portable storage device and the host.

In view of the above it should be apparent that a portable storage device may provide for robust data portability with a high degree of security by way of a two-stage security process.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
a physical storage medium;
a battery;
a wireless circuitry comprising a wireless power circuit; and
a portable sealed housing containing the physical storage medium, the battery, and the wireless circuitry, the wireless circuitry positioned with respect to the housing to communicate a signal wirelessly through a wall of the housing;
wherein the physical storage medium stores a first security protocol comprising authenticating a first user credential to activate the wireless power circuit and initiate wireless charging of the battery, and a second security protocol comprising authenticating a second user credential that's different from the first user credential to allow data transfer between the physical storage medium and a host device via the wireless circuitry;
wherein successful authorization of a user through the first security process activates the wireless power circuit to receive power from the host device; and
wherein after successful authorization of the user through the first security process, execute the second security process that is different from the first security process, and upon successful authorization of the user through the second security process, allow data transfer between the host device and the physical storage medium powered by the wireless power circuit.

2. The device of claim 1, wherein execution of the second security protocol s conditional on successful authorization via the first security protocol.

3. The device of claim 1, wherein the first security protocol includes checking a user's password.

4. The device of claim 1, wherein the second security protocol includes checking a user's biometric.

5. The device of claim 1, further comprising a wireless communications circuit, wherein the second security protocol is to activate the wireless communications circuit upon successful authorization via the second security protocol.

6. A device comprising:
a physical storage;
wireless circuitry comprising a wireless power circuit;
a battery; and
a portable sealed housing containing the storage, wireless circuitry, and battery, the wireless circuitry positioned with respect to the housing to communicate a signal wirelessly through a wall of the housing;
wherein the storage stores a two-stage security protocol to initiate wireless charging of the battery via the wireless circuitry and communicate data between the storage and a host device via the wireless circuitry;
wherein the two-stage security protocol includes a first security protocol that comprises authenticating a first user credential to activate the wireless power circuit, and a second security protocol that comprises authenticating a second user credential to allow data communication via the wireless circuitry between the storage and the host device;
wherein successful authorization of a user through the first security process activates the wireless power circuit to receive power from the host device; and
wherein after successful authorization of the user through the first security process, execute the second security process that is different from the first security process, and upon successful authorization of the user through the second security process, allow data transfer between the host device and the physical storage medium powered by the wireless power circuit.

7. The device of claim 6, wherein the two-stage security protocol is to allow communication of data between the storage and the host device via the wireless circuitry contingent on successful passing of both stages of the two-stage security protocol.

8. The device of claim 6, wherein the storage includes bootable code.

9. The device of claim 6, wherein the two-stage security protocol includes first stage that controls wireless charging of the battery via the wireless circuitry and a second stage that controls data communication via the wireless circuitry.

10. The device of claim 9, wherein the wireless circuitry includes the wireless power circuit connected to the battery and a wireless communications circuit connected to the storage.

11. A non-transitory machine-readable medium comprising instructions that, when executed by a processor, cause the processor to:
execute a first security process comprising authenticating a first user credential, wherein successful authorization of a user through the first security process activates a wireless power circuit of a storage device to receive power from a host device and initiate wireless charging of a battery of the storage device, wherein the storage device comprises a portable sealed housing containing a physical storage medium, the battery, and a wireless circuitry comprising the wireless power circuit, the wireless circuitry positioned with respect to the housing to communicate a signal wirelessly through a wall of the housing, and the physical storage medium stores the first and second security processes; and
after successful authorization of the user through the first security process, execute a second security process that is different from the first security process and comprises authenticating a second user credential that is different from the first user credential, wherein successful authorization of the user through the second security process allows data transfer between the host device and the physical storage medium of the storage device via the wireless circuitry and powered by the wireless power circuit.

12. The non-transitory machine-readable medium of claim 11, wherein the first or second security process includes establishing a password based on a physical identifier attached to the storage device.

13. The non-transitory machine-readable medium of claim 11, wherein the irst or second security process includes instructions to communicate with a computing device operated by the user.

14. The non-transitory machine-readable medium of claim 11, wherein the instructions include a boot sector that is bootable by the host device.

15. The non-transitory machine-readable medium of claim 11, wherein the first security process, the second security process, or both the first and second security processes include a timeout based on loss of contact with the host device.

\* \* \* \* \*